United States Patent [19]

Gross et al.

[11] 4,191,532
[45] Mar. 4, 1980

[54] ORGANIC COMPOUNDS

[75] Inventors: Rolf Gross, Reinach; René Fricker, Allschwil, both of Switzerland

[73] Assignee: Sandoz Ltd., Basel, Switzerland

[21] Appl. No.: 872,407

[22] Filed: Jan. 26, 1978

[51] Int. Cl.² .......................... D06P 1/00; D06P 1/39
[52] U.S. Cl. ........................................ 8/21 A; 8/21 A;
8/22; 8/88; 8/89 R; 8/90; 8/92; 8/93
[58] Field of Search ............... 8/25, 88, 92, 93, 89 R, 8/90, 21 A

[56] References Cited
FOREIGN PATENT DOCUMENTS 838175 8/1976 Belgium .
2442421 4/1976 Fed. Rep. of Germany .

Primary Examiner—A. Lionel Clingman

Attorney, Agent, or Firm—Gerald D. Sharkin; Richard E. Vila; Thomas C. Doyle

[57] ABSTRACT

Disclosed is a liquid dye concentrate for dilution down to form a dyebath for the dyeing of blend substrates comprising acid and cationic dyeable fibres, which concentrate comprises at least one acid dye, at least one cationic dye and, as auxiliary agents, a nonionic or anionic polyglycol ether, or a mixture thereof, and a cationic, amino group containing polyglycol ether, other preferred optional additives being a low molecular weight carboxylic acid, such as acetic or formic, and one or more aliphatic $C_{6-16}$ alcohols, particularly for viscosity stabilization and/or foam inhibition. Also disclosed is a dyeing process employing such a concentrate in dilute form.

28 Claims, No Drawings

ORGANIC COMPOUNDS

The present invention relates to dye preparations and dyeing processes employing the same.

In the dyeing of textile substrates which are blends of acid and cationic dyeable fibres, combination dyeing, often involving two dyeing steps has to be carried out if both types of fibre are to be dyed satisfactorily. Recent trends have been to effect the dyeing in a single bath employing together one or more acid dyes and one or more cationic dyes, the dye bath being prepared by separate addition of the different types of dyes and other additives. This mode of operation is, however, not without problems, particularly where tone-in-tone dyeings are required.

The present invention provides a ready made up liquid dye concentrate comprising both acid and cationic dyestuffs, which concentrate can be made in stable form, notwithstanding the known general incompatibility of the two types of dyes, and which can merely be diluted to form the dyebath, optionally with addition of conventional dyeing aids.

Thus, according to the present invention a liquid dye concentrate of at least one acid dye and at least one cationic dye is provided, characterised in that the concentrate contains, as auxiliary agents, a non-ionic or anionic polyglycol ether or a mixture thereof, and a cationic, amino group containing polyglycol ether.

The non-ionic and anionic polyglycol ethers employed in the concentrates of the invention preferably contain at least 4 alkyleneoxide (preferably $C_{2-3}$) units, the upper limit being about 100 such units. The optimum number of alkylene oxide units depends to some extent on the nature of the polyglycolated compound, but is generally in the range 10 to 80, especially 15 to 50. The preferred alkylene oxide units are ethylene oxide units.

As non-ionic polyglycol ethers the following types are preferred.

1. Addition products of 6 to 90, especially 10 to 60 mols of an alkylene oxide especially ethylene oxide, with an aliphatic alcohol of 14 to 20, preferably 14 to 18, carbon atoms. The alcohol may be saturated or unsaturated. The most preferred polyglycol ethers of this type are the addition products of oleylalcohol with 10 to 30 mols of ethylene oxide.

2. Addition products of 8 to 100, especially 20 to 50, mols of an alkylene oxide, especially ethylene oxide, with a mono- or dialkylphenol of total alkyl carbon atom content of 8 to 24. The most preferred polyglycol ethers of this type are nonyl- and di-nonylphenolpolyglycol ethers with 30 to 40 glycol units.

3. Addition products of 5 to 100, especially 20 to 60, mols of an alkylene oxide, especially ethylene oxide, with saturated and unsaturated aliphatic acids containing 12 to 20 carbon atoms, e.g. oleic acid, tallow fat acid, soybean oil acid and similar fatty acids of animal or vegetable origin.

4. Addition products of 20 to 60, especially 30 to 40, alkylene oxide, especially ethylene oxide, units with castor oil.

5. Addition products of alkylene oxide, especially ethylene oxide, with polypropylene glycols and polytetrahydrofurans of molecular weight in the range of 1000 to 5000, the addition products being produced employing 30 to 100 parts by weight of alkylene oxide per part by weight of the polypropyleneglycol or polytetrahydrofuran.

Mixtures of the above non-ionic polyglycol ethers may be employed.

As anionic polyglycol ethers can be mentioned the carboxymethylated (e.g. employing chloroacetic acid) derivatives of the above non-ionic polyglycol ethers, especially those of types 1 and 2. Also suitable are the sulphuric acid half ester derivatives (or alkali metal or ammonium salt forms thereof) of the addition products of 20 to 100 mols of alkylene oxide, especially ethylene oxide, with $C_{14-20}$ aliphatic alcohols such as palmityl alcohol, stearyl alcohol, alcohols obtained through reduction of natural fatty acids, such as tallow fat alcohol and oleyl alcohol, alcohols obtained from terminal olefins by catalytic addition of carbon monoxide and water, and diols obtained through catalytic polymerisation of ethylene oxide, up to molecular weight 3,000. Similarly suitable are the sulphuric acid half esters or the alkali metal or ammonium salts thereof, of addition products of 4 to 40 mols of alkylene oxide, especially ethylene oxide, with an alkyl or dialkyl phenol with a total of 8 to 24 carbon atoms in the alkyl group(s).

Mixtures of the above anionic polyglycol ethers may be employed.

Where an anionic polyglycol ether is employed other than in admixture with the non-ionic polyglycol ether, it is preferably one having relatively weak anionic character, i.e. it preferably contains carboxy as opposed to sulpho groups. Any anionic polyglycol ether of relatively strong anionic character, e.g. the sulphuric acid half esters above mentioned, is preferably employed in admixture with a non-ionic polyglycol ether, its anionic character thereby being effectively diluted.

The cationic polyglycol ethers are preferably amino group containing polyglycol ethers with from about 5 up to 120 alkylene oxide (preferably $C_{2-3}$) units. Again, those containing ethylene oxide units are preferred. Particularly preferred are the reaction products of aliphatic amines, particularly of 16 to 20 carbon atoms such as stearylamine, palmitylamine or oleylamine with 7 to 20 mols ethylene oxide. Similarly, suitable are amines found from the corresponding fatty alcohol by reacting for example, epichlorohydrin with a (2-6)polyalkylene-($C_{2-3}$)polyamine especially diethylenetriamine or triethylenetriamine and treating the product with 7 to 20 units of a ($C_{2-3}$)alkylene oxide, especially ethylene oxide, preferably with subsequent quaternisation, especially with dimethylsulphate.

Also particularly suitable are condensation products of higher alkyl($C_{12-20}$)oxyalkylene($C_{2-4}$) oxides with poly(2-6)alkylene($C_{2-3}$)polyamines and lower, e.g. $C_{2-3}$, alkylene oxides, such as the reaction product of oleyloxy propylene oxide, diethylene triamine and 8 to 15 mols ethylene oxide, and of tallow fat propylene diamine with 20 to 50 mols ethylene oxide.

Mixtures of the above cationic polyglycol ethers may be employed. Representative polyglycol ethers of each of the above types are commercially available.

In the concentrates of the invention, the total content of the polyglycol ether auxiliary agents therein is preferably from 10 to 50%, more preferably 15 to 40% and most preferably 20 to 30%, by weight, based on the total weight of the concentrate. The weight ratio of non-ionic and/or anionic to cationic polyglycol ether depends on the nature of the dyestuffs contained in the concentrate, the nature of the particular polyglycol ethers chosen, the degree of stability desired of the concentrate and the nature of the substrate subsequently to be dyed. By variation of the weight ratio optimum results can be achieved. In general, the weight ratio of non-ionic and/or anionic polyglycol ether to cationic polyglycol ether is in the range of from 50:1 to 1:1, preferably 1:01 and 1:1 and most preferably 5:1 to 2:1.

Advantageously, the concentrates according to the invention also contain a low molecular weight carboxylic acid of the type conventionally employed when dyeing from acid media, particularly formic acid or glacial acetic acid. The preferred content of such acid in the concentrate is from 10 to 30%, more preferably 15 to 25%, based on the total weight of the concentrate.

Other additives may also be contained in the concentrate. For example, the addition of one or more higher aliphatic ($C_{6-16}$) alcohols serves to stabilise the viscosity of the concentrate and inhibits foam formation. Such alcohol(s), when present, is(are) preferably present in an amount of from 5 to 15% by weight, based on the total weight of the concentrate. For viscosity stabilisation, alcohols of 12 to 15, especially secondary $C_{13}$ alcohols are preferred. For foam inhibition, alcohols of 8 to 10 carbon atoms, especially isononyl alcohol, are preferred. Thus, for optimum results, a mixture of the two types of alcohols is preferred, the preferred weight ratio of one to the other being 1:1.

As regards the dyestuffs contained in the concentrates, the preferred ones, both acid and basic, are those having good solubility in cold water. In this regard, the preferred acid dyes are the following Colour Index dyes:

Acid Blue—227, 127:1, 278, 92, 181, 296, 221, 203 and 140
Acid Yellow—61, 127, 111, 129, 112, 218 and 75
Acid Orange—156
Acid Green—28, 106, 81 and 44
Acid Red—249, 261, 263, 215, 11, 118, 336, 301, 145, 143 and 359.
Acid Brown—363
Reactive Yellow—69 and 39
Reactive Red—100, 28, 184, 168(5) and 72
Reactive Blue—94, 114, 69, 115(5) and 60

As regards the cationic dyestuff, such is preferably one easily formed into liquid or pseudo-liquid form, especially preferred being the following Colour Index dyes:
Basic Yellow—13, 45, 82 and 85
Basic Red—22 and 46
Basic Blue—41, 77 and 141

The amount of dyestuff (active substance) present in the concentrates can vary within wide limits, but is generally within the range of from 5 to 50% by weight, based on the total weight of the concentrate. Naturally the more water soluble the dyestuff chosen, the greater the possible concentration thereof in the concentrate without stability or settling-out problems arising.

The weight ratio of anionic to cationic dyestuff in the concentrate is variable but is generally in the range of from 3:1 to 1:3, preferably from 2:1 to 1:2.

The dyestuffs may be employed in commercially available form, in solid or liquid form, or in press cake or paste form as obtained direct from production. It is preferable, however, to employ dyestuffs to which have not been added standardising agents and solid diluents etc.

The preferred concentrates provided by the invention, therefore, contain the following components
water (preferably demineralised)
one or more anionic (acid) dyes
one or more cationic (basic) dyes
a non-ionic or anionic polyglycol ether or mixture thereof,
a cationic amino group containing polyglycol ether or a mixture thereof,
a lower carboxylic acid (preferably formic or glacial acetic acid), and
one or more higher alcohols for viscosity stability and/or foam inhibition.

Employing the concentrates of the invention, after suitable dilution, it is possible to obtain binary and ternary shades, including brown and grey shades. The fastness properties, especially wet- and lightfastness, of the dyeings obtained are well up to standard, being, for example, comparable to the fastness properties on pure wool of the acid dye. Bath exhaustion is also good.

As regards the production of the concentrates according to the invention, this can follow several routes, i.e. sequences of addition of the various components. The following are illustrative of preferred techniques.

1. Firstly the cationic polyglycol ether is taken and the anionic and/or non-ionic polyglycol ether is added thereto. This mixture is then warmed and water (preferably demineralised) is added, followed by the stirring in of the anionic dyestuff(s). After cooling, the basic dyestuff(s) is (are) then added. Where a lower carboxylic acid and/or higher alcohol(s) is (are) desired in the concentrates, they can then finally be added, the acid generally prior to the alcohol(s) if both are to be included.

2. The cationic dyestuff(s) is (are) first mixed with the carboxylic acid followed by addition of the higher alcohol(s) and then the anionic dyestuff(s). To this mixture is then added a pre-prepared mixture of the non-ionic and/or anionic polyglycol ether and the cationic polyglycol ether. If desired, the first mixture can be added to the second.

Dyeing with the liquid concentrations according to the invention may be carried out in conventional manner. Suitably, after dilution of the concentrate with softened water (15 to 30 times the amount), the bath is heated to 50° to 60° C. and adjusted to the desired pH value (approximately 5) with ammonium sulphate and formic acid. After entering the goods to be dyed the bath is heated and the fabric is dyed at the boil. Rinsing and soaping of the dyed fabric are effected in conventional manner. A relatively long duration (approximately 1½ hours) at the boil is needed. Addition of formic acid towards the end of the dyeing period is advantageous.

In the following Examples the parts and percentages are by weight unless otherwise stated, and the temperatures are in degrees Centigrade.

EXAMPLES

The mixtures of the following Examples 1 to 3 are prepared according to the following method:

The cationic condensation product of oleyloxypropylene oxide, diethylenetriamine and 10 mols ethylene oxide (quaternised) - Agent A and the non-ionic condensation product of dinonylphenol and approximately 33 mols ethylene oxide - Agent B, were mixture by stirring and slowly warming to 50°. Then, the mixture is diluted with demineralized water at 50°. After about 5 minutes a homogeneous paste is obtained. The anionic dyestuff is added in portions thereto. After completion of the addition of the anionic dyestuff, the mixture is stirred for approximately 10 minutes and is cooled to 25°. The liquid or solid form of the cationic dyestuff is added thereto with stirring until homogeneity is obtained. Finally, glacial acetic acid (86%) is added and the mixture is stirred to homogeneity. The amounts of the various components are indicated below.

EXAMPLE 1

| | |
|---|---|
| 34.42 Parts | C.I. Acid Orange 156, liquid |
| 10.33 Parts | C.I. Basic Yellow 82, liquid 200% |
| 0.11 Parts | C.I. Basic Red 22, liquid |
| 0.07 Parts | C.I. Basic Blue 77, liquid |
| 17.21 Parts | Agent A |
| 9.18 Parts | Agent B |
| 11.47 Parts | demineralized water |
| 17.21 Parts | glacial acetic acid (85%) |
| 100.00 Parts | |

EXAMPLE 2

| | |
|---|---|
| 24.63 parts | C.I. Acid Red 249, 120% |
| 13.55 Parts | C.I. Basic Red 22, liquid |
| 0.24 Parts | C.I. Basic Blue 77, liquid |
| 18.47 Parts | Agent A |
| 12.32 Parts | Agent B |
| 12.32 Parts | demineralized water |
| 18.47 Parts | glacial acetic acid (85%) |
| 100.00 Parts | |

EXAMPLE 3

| | |
|---|---|
| 18.40 Parts | C.I. Acid Blue 227 |
| 0.37 Parts | C.I. Basic Yellow 82, liquid 200% |
| 0.25 Parts | C.I. Basic Red 22, liquid |
| 22.09 Parts | C.I. Basic Blue 77, liquid obtained from 35% acetic acid |
| 18.40 Parts | Agent A |
| 9.81 Parts | Agent B |
| 12.28 Parts | demineralized water |
| 18.40 Parts | glacial acetic acid (85%) |
| 100.00 Parts | |

For the production of the dyestuff mixtures of Examples 4–24 the following conditions are employed:

the liquid or solid form (depending on the dyestuff) of the cationic dyestuff is stirred into the glacial acetic acid (85%) at room temperature until homogeneity is obtained. Secondary tridecyl alcohol is added thereto and immediately after is added isononyl alcohol, the mixture being stirred to homogeneity. Finally, the anionic dyestuff (solid form) is stirred into the mixture. At the same time a mixture of the following ingredients is prepared:

the non-ionic or weakly anionic auxiliary agents $A_1$ or $A_2$, respectively are mixed with the cationic auxiliary agent $B_1$ or $B_2$, respectively, under stirring for about 10 minutes.

This mixture is slowly added to the above mentioned dyestuff mixture and stirred for 30 minutes. The mixtures are homogeneous, do not foam and are stable. In the following Examples 4–24 the auxiliary agents are as follows:

$A_1$—A commercially available weakly anionic product obtained from approximately 33 mols ethylene oxide with dinonylphenol, carboxy methylated with chloro acetic acid.

$A_2$—A commercially available non-ionic product obtained from approximately 24 mols of ethylene oxide with 1 mol oleylalcohol.

$B_1$—A cationic product obtained from 10 mols ethylene oxide with oleyloxypropylene oxide and diethylenetriamine - quaternised - liquid form 95% active ingredients.

$B_2$—A cationic product obtained from 35 mols ethylene oxide with tallow fatty aminopropylamine.

The ingredients in the following Examples are indicated in the order in which they are mixed.

EXAMPLE 4

| | |
|---|---|
| 16.50 Parts | glacial acetic acid |
| 20.00 Parts | C.I. Basic Yellow 85 |
| 1.00 Part | C.I. Basic Yellow 82 |
| 5.00 Parts | isononyl alcohol |
| 28.50 Parts | C.I. Reactive Yellow 69 |
| 17.00 Parts | Agent $A_2$ |
| 7.00 Parts | Agent $B_2$ |
| 100.00 Parts | |

EXAMPLE 5

| | |
|---|---|
| 18.00 Parts | glacial acetic acid |
| 12.30 Parts | C.I. Basic Yellow 82 |
| 8.70 Parts | C.I. Basic Red 22 |
| 5.00 Parts | secondary tridecyl alcohol |
| 5.00 Parts | isononyl alcohol |
| 27.00 Parts | Reactive Red 28, 150% |
| 17.00 Parts | Agent $A_1$ |
| 7.00 Parts | Agent $B_1$ |
| 100.00 Parts | |

EXAMPLE 6

| | |
|---|---|
| 23.40 Parts | glacial acetic acid |
| 12.00 Parts | C.I. Basic Red 22 |
| 0.60 Parts | C.I. Basic Blue 41 |
| 5.00 Parts | secondary tridecyl alcohol |
| 5.00 Parts | isononyl alcohol |
| 30.00 Parts | C.I. Reactive Red 100 |
| 17.00 Parts | Agent $A_2$ |
| 7.00 Parts | Agent $B_2$ |
| 100.00 Parts | |

EXAMPLE 7

| | |
|---|---|
| 17.20 Parts | glacial acetic acid |
| 0.80 Parts | C.I. Basic Red 22 |
| 19.00 Parts | C.I. Basic Blue 41 |
| 5.00 Parts | secondary tridecyl alcohol |
| 5.00 Parts | isononyl alcohol |
| 29.00 Parts | C.I. Reactive Blue 94 |
| 17.00 Parts | Agent $A_1$ |
| 7.00 Parts | Agent $B_1$ |
| 100.00 Parts | |

EXAMPLE 8

| | |
|---|---|
| 17.00 Parts | glacial acetic acid |
| 0.50 Parts | C.I. Basic Yellow 85 |
| 19.00 Parts | C.I. Basic Blue 41 |
| 5.00 Parts | secondary tridecyl alcohol |
| 5.00 Parts | isononyl alcohol |
| 29.50 Parts | C.I. Reactive Blue 94 |

-continued

| | |
|---|---|
| 17.00 | Parts Agent $A_1$ |
| 7.00 | Parts Agent $B_1$ |
| 100.00 | Parts |

EXAMPLE 9

| | |
|---|---|
| 14.00 | Parts glacial acetic acid |
| 8.00 | Parts C.I. Basic Yellow 85 |
| 7.00 | Parts C.I. Basic Yellow 82 |
| 8.00 | Parts C.I. Basic Red 22 |
| 5.00 | Parts secondary tridecyl alcohol |
| 5.00 | Parts isononyl alcohol |
| 29.00 | Parts C.I. Acid Red 145 |
| 17.00 | Parts Agent $A_2$ |
| 7.00 | Parts Agent $B_2$ |
| 100.00 | Parts |

EXAMPLE 10

| | |
|---|---|
| 23.40 | Parts glacial acetic acid |
| 12.00 | Parts C.I. Basic Red 22 |
| 0.60 | Parts C.I. Basic Blue 41 |
| 5.00 | Parts secondary tridecyl alcohol |
| 5.00 | Parts isononyl alcohol |
| 30.00 | Parts C.I. Acid Red 143 |
| 17.00 | Parts Agent $A_1$ |
| 7.00 | Parts Agent $B_2$ |
| 100.00 | Parts |

EXAMPLE 11

| | |
|---|---|
| 14.00 | Parts glacial acetic acid |
| 4.00 | Parts C.I. Basic Yellow 82 |
| 5.00 | Parts C.I. Basic Red 22 |
| 15.00 | Parts C.I. Basic Blue 41 |
| 5.00 | Parts secondary tridecyl alcohol |
| 5.00 | Parts isononyl alcohol |
| 17.00 | Parts Agent $A_2$ |
| 7.00 | Parts Agent $B_2$ |
| 100.00 | Parts |

EXAMPLE 12

| | |
|---|---|
| 17.00 | Parts glacial acetic acid |
| 1.00 | Part C.I. Basic Red 22 |
| 19.00 | Parts C.I. Basic Blue 41 |
| 5.00 | Parts secondary tridecyl alcohol |
| 5.00 | Parts isononyl alcohol |
| 29.00 | Parts C.I. Reactive Blue 114 |
| 17.00 | Parts Agent $A_1$ |
| 7.00 | Parts Agent $B_1$ |
| 100.00 | Parts |

EXAMPLE 13

| | |
|---|---|
| 16.00 | Parts glacial acetic acid |
| 21.00 | Parts C.I. Basic Blue 41 |
| 5.00 | Parts secondary tridecyl alcohol |
| 5.00 | Parts isononyl alcohol |
| 29.00 | Parts C.I. Acid Blue 221 |
| 17.00 | Parts Agent $A_1$ |
| 7.00 | Parts Agent $B_2$ |
| 100.00 | Parts |

EXAMPLE 14

| | |
|---|---|
| 23.00 | Parts glacial acetic acid |
| 1.00 | Parts C.I. Basic Yellow 82 |
| 12.00 | Parts C.I. Basic Red 22 |
| 1.00 | Parts C.I. Basic Blue 41 |
| 5.00 | Parts secondary tridecyl alcohol |
| 5.00 | Parts isononyl alcohol |
| 29.00 | Parts Acidolbordeaux MB |
| 17.00 | Parts Agent $A_2$ |
| 7.00 | Parts Agent $B_2$ |
| 100.00 | Parts |

EXAMPLE 15

| | |
|---|---|
| 14.50 | Parts glacial acetic acid |
| 20.00 | Parts C.I. Basic Yellow 82 |
| 6.50 | Parts C.I. Basic Red 22 |
| 5.00 | Parts secondary tridecyl alcohol |
| 5.00 | Parts isononyl alcohol |
| 25.00 | Parts C.I. Acid Red 359 |
| 17.00 | Parts Agent $A_2$ |
| 7.00 | Parts Agent $B_2$ |
| 100.00 | Parts |

EXAMPLE 16

| | |
|---|---|
| 17.00 | Parts glacial acetic acid |
| 21.00 | Parts C.I. Basic Yellow 45 |
| 5.00 | Parts secondary tridecyl alcohol |
| 5.00 | Parts isononyl alcohol |
| 28.00 | Parts C.I. Reactive Yellow 39 |
| 17.00 | Parts Agent $A_2$ |
| 7.00 | Parts Agent $B_2$ |
| 100.00 | Parts |

EXAMPLE 17

| | |
|---|---|
| 24.00 | Parts glacial acetic acid |
| 12.00 | Parts C.I. Basic Red 84 |
| 5.00 | Parts secondary tridecyl alcohol |
| 5.00 | Parts isononyl alcohol |
| 30.00 | Parts C.I. Reactive Red 84 |
| 17.00 | Parts Agent $A_1$ |
| 7.00 | Parts Agent $B_2$ |
| 100.00 | Parts |

EXAMPLE 18

| | |
|---|---|
| 18.00 | Parts glacial acetic acid |
| 19.00 | Parts C.I. Basic Blue 41 |
| 5.00 | Parts secondary tridecyl alcohol |
| 5.00 | Parts isononyl alcohol |
| 29.00 | Parts C.I. Reactive Blue 69 |
| 17.00 | Parts Agent $A_2$ |
| 7.00 | Parts Agent $B_1$ |
| 100.00 | Parts |

EXAMPLE 19

| | |
|---|---|
| 16.50 | Parts glacial acetic acid |
| 17.00 | Parts C.I. Basic Yellow 85 |
| 4.00 | Parts C.I. Basic Yellow 82 |
| 5.00 | Parts secondary tridecyl alcohol |
| 5.00 | Parts isononyl alcohol |
| 28.50 | Parts Hostalan brilliant yellow E-G |

-continued

| | |
|---|---|
| 17.00 | Parts Agent $A_1$ |
| 7.00 | Parts Agent $B_1$ |
| 100.00 | Parts |

EXAMPLE 20

| | |
|---|---|
| 14.00 | Parts glacial acetic acid |
| 8.00 | Parts C.I. Basic Yellow 85 |
| 8.00 | Parts C.I. Basic Yellow 82 |
| 6.00 | Parts C.I. Basic Red 22 |
| 5.00 | Parts secondary tridecyl alcohol |
| 5.00 | Parts isononyl alcohol |
| 30.00 | Parts C.I. Reactive Red 168 (S) |
| 17.00 | Parts Agent $A_1$ |
| 7.00 | Parts Agent $B_1$ |
| 100.00 | Parts |

EXAMPLE 21

| | |
|---|---|
| 17.50 | Parts glacial acetic acid |
| 0.50 | Parts C.I. Basic Red 22 |
| 19.00 | Parts C.I. Basic Blue 41 |
| 5.00 | Parts secondary tridecyl alcohol |
| 5.00 | Parts isononyl alcohol |
| 29.00 | Parts C.I. Reactive Blue 155 (S) |
| 17.00 | Parts Agent $A_2$ |
| 7.00 | Parts Agent $B_2$ |
| 100.00 | Parts |

EXAMPLE 22

| | |
|---|---|
| 24.00 | Parts glacial acetic acid |
| 12.00 | Parts Synacril Red G liquid |
| 5.00 | Parts secondary tridecyl alcohol |
| 5.00 | Parts isononyl alcohol |
| 30.00 | Parts C.I. Reactive Red 72 |
| 17.00 | Parts Agent $A_2$ |
| 7.00 | Parts Agent $B_2$ |
| 100.00 | Parts |

EXAMPLE 23

| | |
|---|---|
| 17.00 | Parts glacial acetic acid |
| 2.00 | Parts Synacril Red G liquid |
| 20.00 | Parts C.I. Basic Blue 41 |
| 5.00 | Parts secondary tridecyl alcohol |
| 5.00 | Parts isononyl alcohol |
| 27.00 | Parts C.I. Acid Blue 140 |
| 17.00 | Parts Agent $A_1$ |
| 7.00 | Parts Agent $A_2$ |
| 100.00 | Parts |

EXAMPLE 24

| | |
|---|---|
| 27.00 | Parts glacial acetic acid |
| 1.00 | Part C.I. Basic Yellow 82 (solid) |
| 14.00 | Parts C.I. Basic Blue 77 (solid) |
| 5.00 | Parts secondary tridecyl alcohol |
| 5.00 | Parts isononyl alcohol |
| 24.00 | Parts C.I. Acid Blue 106 (solid) |
| 17.00 | Parts Agent $A_1$ |
| 7.00 | Parts Agent $A_2$ |
| 100.00 | Parts |

EXAMPLE 25

| | |
|---|---|
| 15.00 | Parts glacial acetic acid |
| 3.00 | Parts C.I. Basic Yellow 85 |
| 5.00 | Parts C.I. Basic Yellow 82 |
| 15.00 | Parts C.I. Basic Blue 41 |
| 5.00 | Parts secondary tridecyl alcohol |
| 5.00 | Parts iso-nonyl alcohol |
| 28.00 | Parts C.I. Acid Green 106 |
| 17.00 | Parts Agent $A_2$ |
| 7.00 | Parts Agent $B_1$ |
| 100.00 | Parts |

EXAMPLE 26

| | |
|---|---|
| 15.00 | Parts glacial acetic acid |
| 3.00 | Parts C.I. Basic Yellow 82 |
| 20.00 | Parts C.I. Basic Blue 41 |
| 5.00 | Parts secondary tridecyl alcohol |
| 5.00 | Parts iso-nonyl alcohol |
| 28.00 | Parts C.I. Acid Blue 158:1 |
| 17.00 | Parts Agent $A_2$ |
| 7.00 | Parts Agent $B_1$ |
| 100.00 | Parts |

EXAMPLE 27

A wool polyacrylic mixed fabric 50:50 (polyacrylic nitrile fibres of the Crylor type) is dyed at a liquor ratio of 1:30 with the dyestuff mixture of Example 1 as follows:

The material to be dyed is added to the dyebath (demineralized water) at 50°–60°. The dyebath contains the following:

0.5% formic acid 4.0% ammonium sulphate (based on the dry weight of the textile) added at a pH value of 4.5

3.0% of the liquid yellow dyestuff mixture of Example 1 (based on the dry weight of the textile) at 40°.

Over a period of 40 minutes the dyebath is heated to the boil and after a further 45 minutes a further 1% of formic acid is added thereto. The dyeing is concluded after a further 15–20 minutes at the boil and the dyed textile is washed and dried in the usual manner. A tone-in-tone dyeing of a bright yellow is obtained.

EXAMPLE 28

Instead of the 3% dyestuff mixture of Example 1, the same amount of the mixture of Example 2 is employed and dyeing is carried out as described in Example 27. A tone-in-tone dyeing of a bright red shade is obtained.

EXAMPLE 29

The procedure of Example 27 is followed but instead of using 3% of the mixture of Example 1, the same amount of the dyestuff mixture of Example 3 is used. A tone-in-tone blue dyeing is obtained.

EXAMPLE 30

With 1.5% of the dyestuff mixture of Example 1 and 1.5% of the dyestuff mixture of Example 2 and employing the procedure as described in Example 27, a dyeing of a binary shade (orange), which is tone-in-tone, is obtained.

EXAMPLE 31

With 1% of the dyestuff mixture of Example 1, 0.5% of the mixture of Example 2 and 1.5% of the mixture of Example 3 and employing the procedure of Example 27 a dyeing of a ternary shade (grey), which is tone-in-tone, is obtained.

What is claimed is:

1. A stable liquid dye concentrate comprising (1) at least one acid dyestuff, (2) at least one cationic dyestuff, (3) a nonionic or anionic polyglycol ether or mixture thereof, and (4) a cationic amino group-containing polyglycol ether, said dyestuffs comprising 5 to 50% by weight of said concentrate and said polyglycol ethers comprising 10–50% by weight of said concentrate.

2. A concentrate of claim 1, wherein said nonionic and anionic polyglycol ethers contain from 4 to 100 alkylene-oxide units.

3. A concentrate of claim 2, wherein said alkylene-oxide units are of 2 or 3 carbon atoms.

4. A concentrate of claim 2, wherein said ethers contain from 10 to 80 alkylene-oxide units.

5. A concentrate of claim 1, wherein the nonionic polyglycol ether is an addition product of 6 to 90 mols of an alkylene-oxide per mol of an aliphatic alcohol of 14 to 20 carbon atoms.

6. A concentrate of claim 1, wherein the nonionic polyglycol ether is an addition product of 8 to 100 mols of alkylene-oxide per mol of a mono- or dialkylphenol of total alkyl carbon content of 8 to 24.

7. A concentrate of claim 1, wherein the nonionic polyglycol ether is an addition product of 5 to 100 mols of an alkylene-oxide per mol of a saturated or unsaturated aliphatic acid containing 12 to 20 carbon atoms.

8. A concentrate of claim 1, wherein the nonionic polyglycol ether is an addition product of 20 to 60 mols of an alkylene-oxide per mol of castor oil.

9. A concentrate of claim 1, wherein the nonionic polyglycol ether is the addition product of a alkylene-oxide with a polypropylene glycol or polytetrahydrofuran of mol wt. from 1,000 to 5,000, 30 to 100 parts by weight of alkylene-oxide being employed per part by weight of the polypropylene glycol or polytetrahydrofuran.

10. A concentrate of claim 1, wherein said anionic polyglycol ether is a carboxymethylated nonionic polyglycol ether.

11. A concentrate of claim 1, wherein said anionic polyglycol ether is a sulphuric acid half ester derivative of an addition product 20 to 100 mols of alkylene-oxide per mol of a $C_{14-20}$ aliphatic alcohol, or an alkali-metal or ammonium salt form of such half ester.

12. A concentrate of claim 1, wherein said anionic polyglycol ether is a sulphuric acid half ester of an addition product of 4 to 40 mols of alkylene-oxide per mol of a mono- or di-alkyl phenol with a total of 8 to 24 carbon atoms in the alkyl group(s), or an alkali-metal or ammonium salt of such half ester.

13. A concentrate of claim 1, wherein the cationic polyglycol ether is an amino group containing polyglycol ether with from 5 to 120 alkylene-oxide units.

14. A concentrate of claim 13, wherein the cationic polyglycol ether is the reaction product of an aliphatic amine of 16 to 20 carbon atoms with 7 to 20 mols of ethylene-oxide.

15. A concentrate of claim 13, wherein the cationic polyglycol ether is the reaction product of 7 to 20 mols of a $(C_{2-3})$alkylene-oxide per mol of the reaction product of epichlorohydrin with a poly(2-6)alkylene($C_{2-3}$)polyamine, the polyglycol ether optionally being quaternised.

16. A concentrate of claim 13, wherein the cationic polyglycol ether is a condensation product of an alkyl($C_{12-20}$)oxyalkylene($C_{2-4}$)oxide with a poly(2-6)-alkylene($C_{2-3}$)polyamine and a $C_{2-3}$alkylene-oxide.

17. A concentrate according to claim 1 wherein the polyglycol ethers comprise 15 to 40% by weight of the concentrate.

18. A concentrate of claim 1, wherein the weight ratio of nonionic and/or cationic polyglycol ether to cationic polyglycol ether is in the range of from 50:1 to 1:1.

19. A concentrate of claim 1, containing additionally a low molecular weight carboxylic acid.

20. A concentrate of claim 19, wherein said acid is formic or acetic.

21. A concentrate of claim 20, wherein said acid is present in an amount of from 10 to 30% based on the total weight of the concentrate.

22. A concentrate of claim 1, containing one or more aliphatic $C_{6-16}$ alcohols.

23. A concentrate of claim 22, wherein said alcohol(s) is (are) present in an amount of from 5 to 15% based on the total weight of the concentrate.

24. A concentrate of claim 22, containing an aliphatic $C_{12-15}$ alcohol.

25. A concentrate of claim 22, containing an aliphatic $C_{8-10}$ alcohol.

26. A concentrate of claim 22, containing both an aliphatic $C_{12-15}$ alcohol and an aliphatic $C_{8-10}$ alcohol in a weight ratio of one to the other of 1:1.

27. A concentrate according to claim 1, wherein the weight ratio of acid dye to cationic dye is from 3:1 to 1:3.

28. A concentrate according to claim 1, containing water.

* * * * *

UNITED STATES PATENT AND TRADEMARK OFFICE
CERTIFICATE OF CORRECTION

PATENT NO. : 4,191,532
DATED : March 4, 1980
INVENTOR(S) : ROLF GROSS  et al.

It is certified that error appears in the above—identified patent and that said Letters Patent is hereby corrected as shown below:

On the title page insert the following:

-- [30]  Foreign Application Priority Data

Jan. 26, 1977   Switzerland............919/77 --.

Signed and Sealed this

Sixteenth Day of June 1981

[SEAL]

Attest:

RENE D. TEGTMEYER

*Attesting Officer*   *Acting Commissioner of Patents and Trademarks*